Nov. 26, 1968  R. S. ROOT  3,412,834
PRESSURE BALANCED HYDRAULIC CLUTCH
Filed July 26, 1966
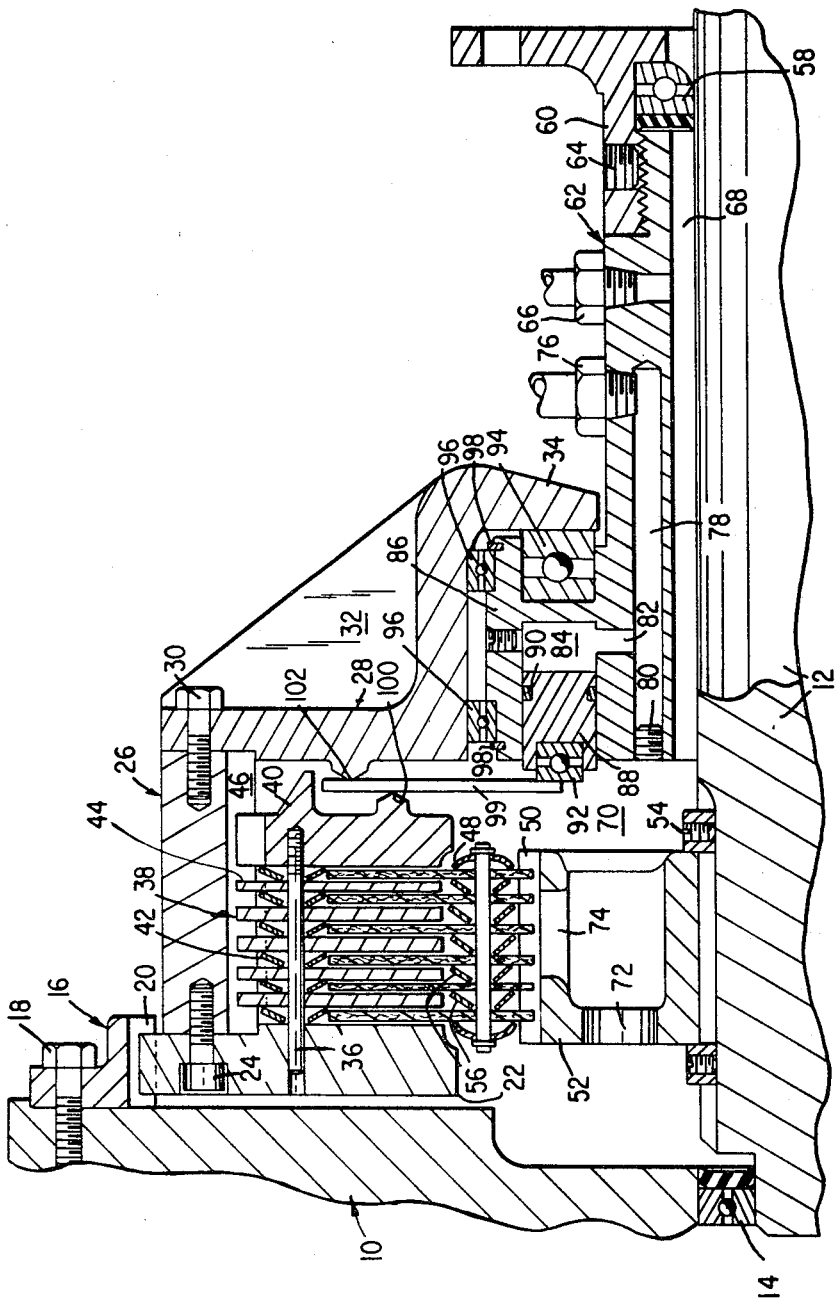
INVENTOR.
ROBERT S. ROOT.
BY
John R. Varney
ATTORNEY.

United States Patent Office 3,412,834
Patented Nov. 26, 1968

3,412,834
PRESSURE BALANCED HYDRAULIC CLUTCH
Robert S. Root, 312 Westvale Road,
Syracuse, N.Y. 13219
Filed July 26, 1966, Ser. No. 568,025
1 Claim. (Cl. 192—85)

ABSTRACT OF THE DISCLOSURE

A self-contained, hydraulically operating clutch release mechanism which functions to eliminate the transmission of release thrust to the engine flywheel and crankshaft. The clutch housing is splined to the flywheel so as to be freely movable relative thereto.

---

This invention relates to and has as an object a new and improved hydraulic clutch. More specifically, it is an object of this invention to provide a new and improved hydraulic clutch which is simple yet reliable in operation but at the same time is economical to manufacture and which incorporates a balanced pressure system.

In the drawing is shown a fragmentary cross-sectional elevational view of a clutch embodying the preferred form of the invention.

The invention consists in the novel features and constructions and the method hereinafter set forth and claimed.

In describing the invention, reference is had to the accompanying drawing in which like characters designate corresponding parts.

The clutch which embodies the preferred form of the invention is similar to the clutch described in my U.S. Patent 3,157,257, to which reference may be had for a more complete description of such a clutch.

Such clutches include a fly wheel or driver 10 and an output or driven shaft 12. The inner end of the shaft 12 is journalled in a sealed bearing 14 and the clutch mechanism transmits the drive torque from the driver 10 to the driven shaft 12. The clutch is made up of a ring member 16 affixed to the driver 10 by means of bolts 18. The ring member 16 is provided with a plurality of inwardly extending teeth 20 which engage slots formed in the periphery of a plate member 22. Affixed to the plate member 22 as by counter-sunk bolts 24 is a ring or annulus 26 which has a cover member 28 affixed thereto by bolts 30. The cover member 28 is ribbed as at 32 and terminates in an inwardly extending flange 34. Carried by a plurality of circumferentially spaced apart pin members 36 are a plurality of circular drive discs 38. The outer end of the pin 36 is threadedly received in a pressure plate 40 and the plurality of disc members 38 are normally positioned in spaced apart relationship by a plurality of Belleville washers 42 carried between the discs. The outer end of the discs 38 are formed with radially outwardly extending teeth 44 which are received in axially extending slots 46 formed on the interior of the ring member 26 in order to provide a sliding drive engagement between the ring member 26 and the discs 38. The discs 38 are also provided with a plurality of circumferentially spaced apertures to provide for circulation of a cooling medium as will be hereinafter described.

Mounted intermediate the discs 38 are a plurality of friction pads 48 which are formed on their inner ends with inwardly extending slots which are received on the splines 50 of a hub member 52 in order to provide a driving yet slidable connection between the friction pads 48 and the hub 52 which is affixed by means of the set screws 54 to the driven shaft 12 for transmitting the driving torque thereto. Positioned between the friction pads 48 are a plurality of Belleville washers 56 to normally position the friction pads at spaced apart relation intermediate the normal spaced apart discs 38.

The clutch is normally disengaged so there is no driving connection between the driver 10 and the shaft 12. The outer end of the shaft 12 is journalled by means of a sealed bearing 58 in a flanged housing 60 whereby the housing may be affixed to a transmission housing for example. Threadedly received in the housing 60 is a cylindrical member 62 which is affixed in the housing 60 by a set screw 64 and the housing 62 is provided with a fluid connector 66. A chamber 68 formed in the member 62 and the chamber 68 communicates with the chamber 70 formed between the cover 28 and the driver 10. The hub member 52 is apertured as at 72 and 74 as are the discs members 38 to permit circulation of the hydraulic fluid in and around the plates 38 and the pads 48. The hydraulic fluid circulates in this chamber and acts as a cooling bath in the operation of the clutch member and the entire mechanism is contained in a fluid tight housing (not shown).

A second fluid connector 76 is connected to the sleeve 62 and communicates an axial bore 78 formed in the sleeve 62, which bore is closed by a set screw 80. The chamber 78 is intersected by a radial bore 82 which connects the chamber 78 to an annular chamber 84 formed in a hub portion 86 on the inner end of the sleeve 62. Mounted in the chamber 84 is an annular piston 88 for reciprocating movement therein, the piston being provided with a fluid sealing ring 90.

Mounted in the outer end of the piston 88 is a throw-out bearing 90 and the hub portion 86 is also provided with a bearing 94 rearwardly of the chamber 84 for a purpose to be hereinafter described. The cover member 28 is journalled on the hub 86 by means of the bearing 94 and a pair of bearings 96 which are retained in place by snap rings 98. As will be understood, hydraulic fluid is introduced into the chamber 84 by means of the connector 76 and chamber 78 and this hydraulic fluid acts against the piston 88 to move it to the left as seen in the drawing. The throw-out bearing 92 engages a clutch lever 99 which is fulcrumed at point 100 formed on the plate 40 and a second point 102 formed on the inner surface of the cover 28.

Accordingly, movement of the lever 99 to the left moves the plate 40 and pin 36 inwardly against the action of the Belleville washers 42 and 56 to close the gap between the discs 38 and the friction pads 48 to provide a driving engagement between the driver 10 and the driven shaft 12. When the fluid pressure is disconnected from the coupling 76 the action of the Belleville washers 42 and 56 will urge the plate 40 to the right, thus in turn moving the piston 88 inwardly in the chamber 84 and forcing the hydraulic fluid out of this chamber and to the chamber 78 and from thence to the coupler 76 to the hydraulic fluid reservoir (not shown).

It will be seen that by virtue of the mounting arrangement of the cover 28 on the bearings 94 and 96 that the disengaging action of the clutch and the back pressure created thereby is absorbed by the hydraulic fluid in the chamber 84 and is transmitted through the clutch to the driven shaft 12 thus providing the clutch with what may be termed a pressure balanced arrangement.

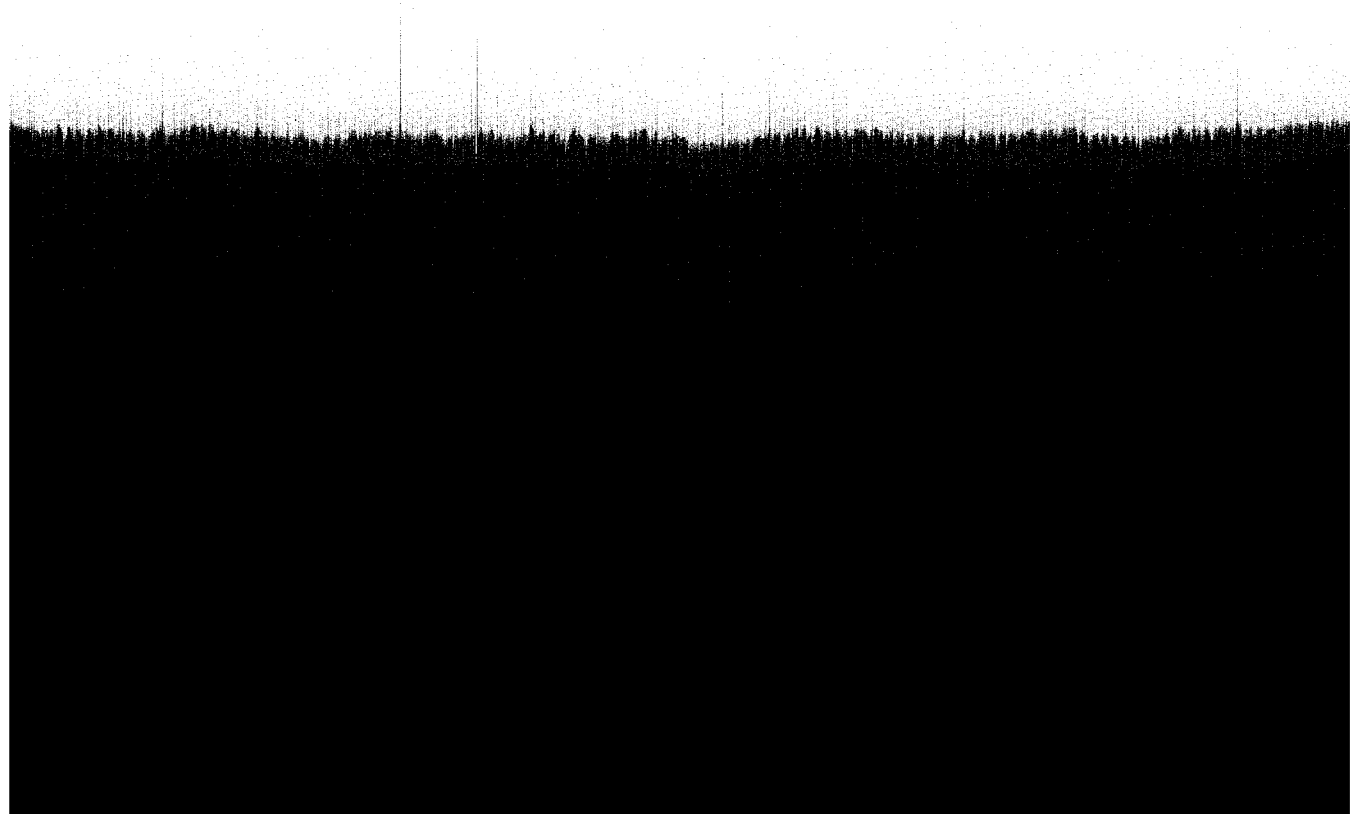

What I claim is:
1. A pressure balanced hydraulic clutch for effecting a driving engagement between a driving member and a driven member comprising a driving member having a cover means connected thereto, a driven member being received in said cover member, a plurality of drive plates connected to said cover member and being normally positioned in spaced apart relation, a plurality of friction pads connected to said driven shaft and being positioned intermediate said drive discs in normally spaced apart